Patented Aug. 5, 1930

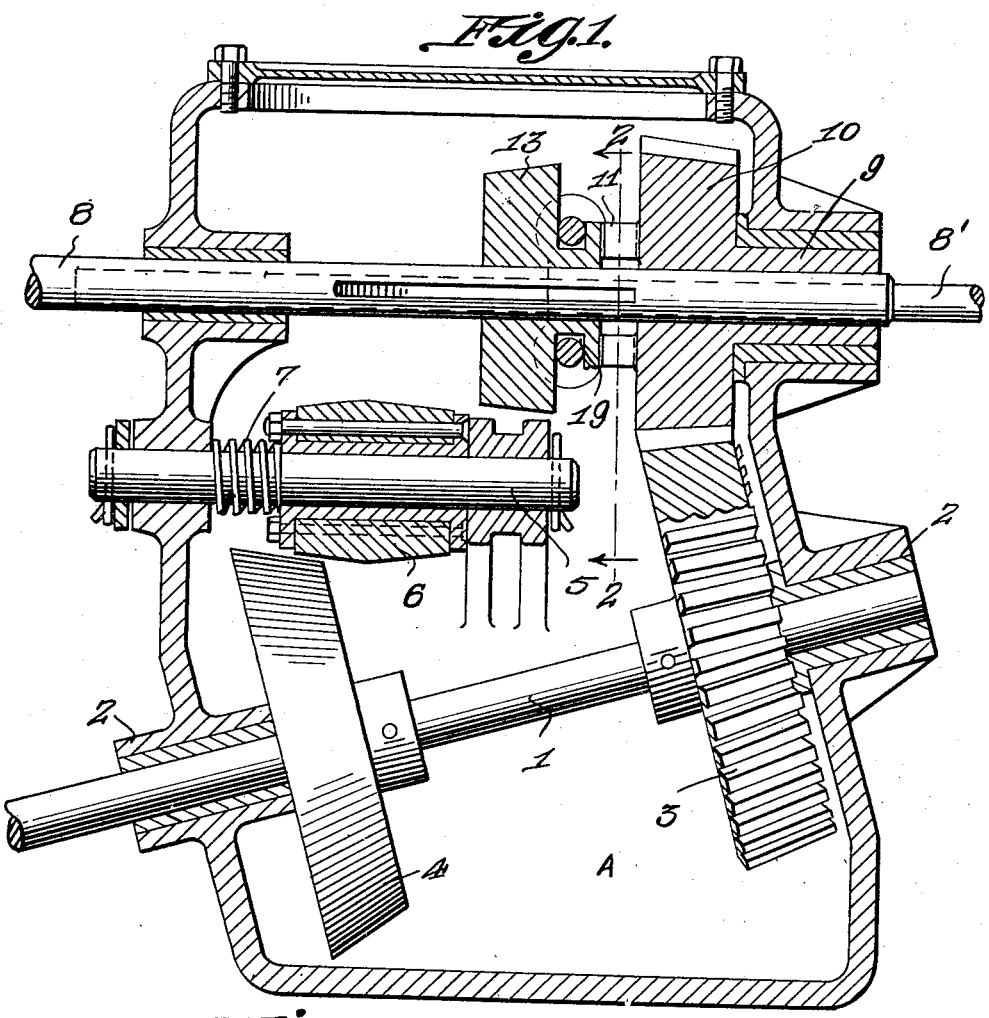
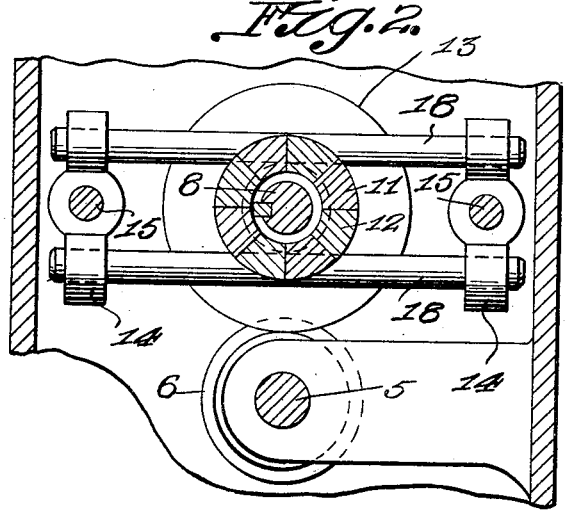
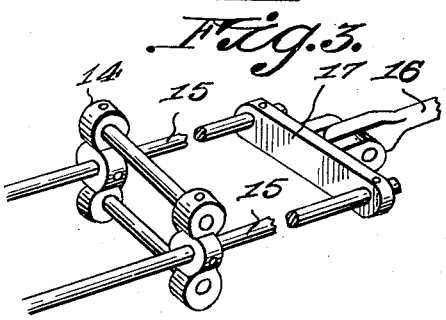

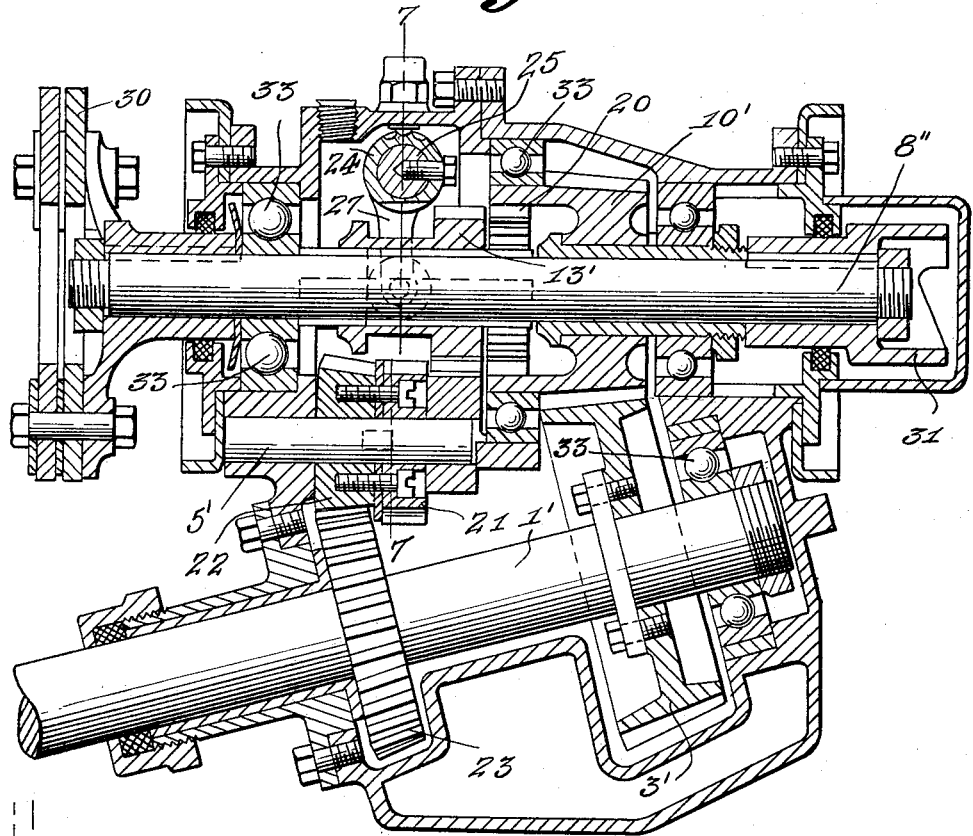
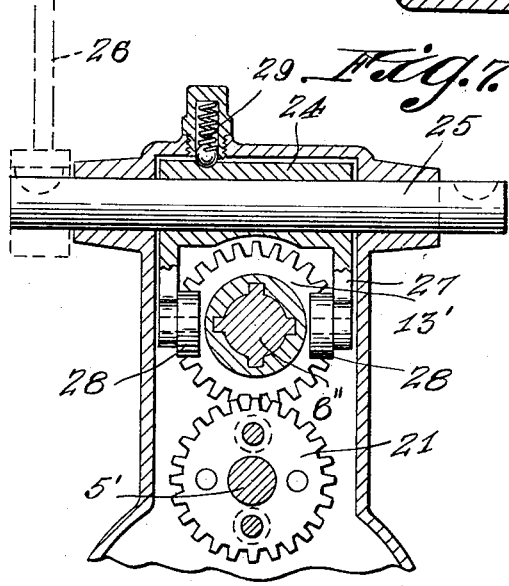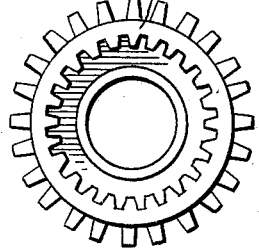

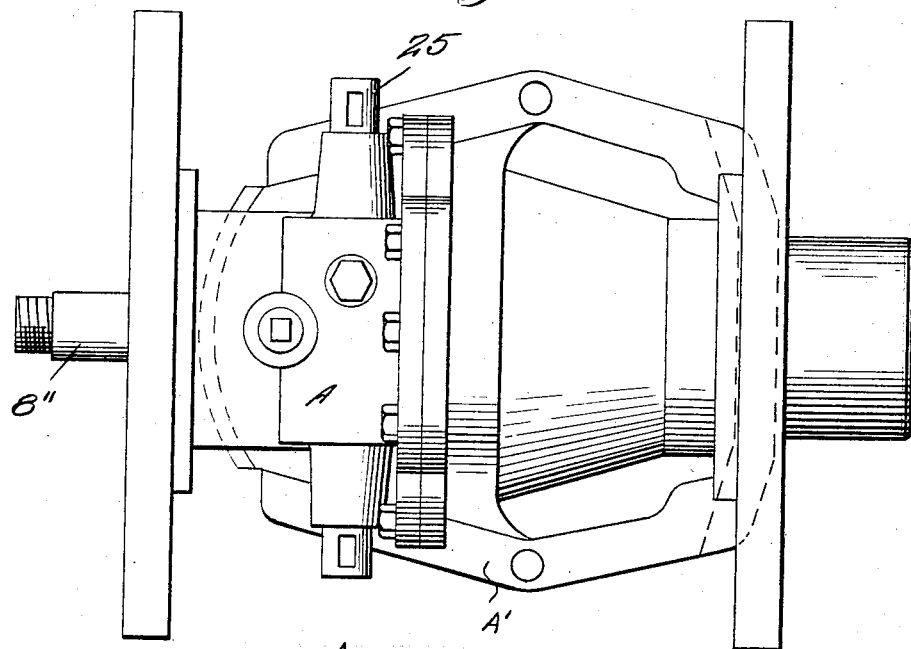
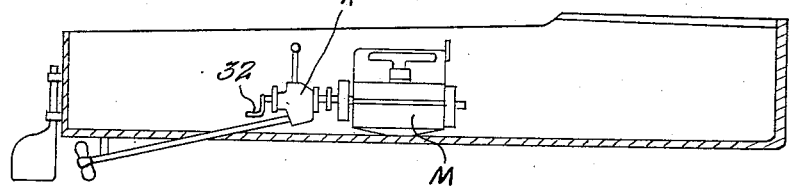
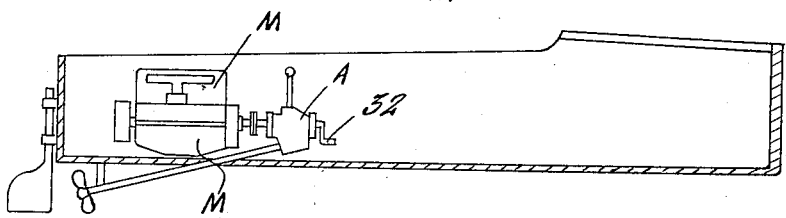
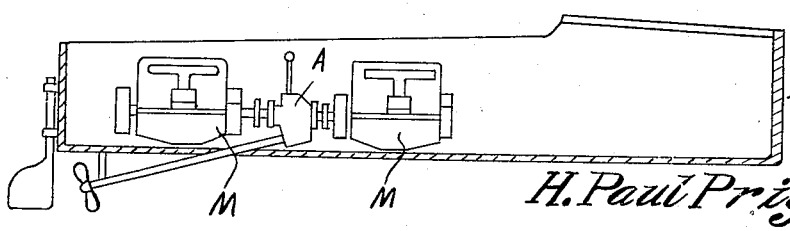

1,772,158

UNITED STATES PATENT OFFICE

HERBERT PAUL PRIGG, OF MIAMI, FLORIDA

COMBINED TRANSMISSION GEAR AND GEAR BOX

Application filed July 19, 1929. Serial No. 379,474.

This invention relates to a combined gear box and transmission gear, the general object of the invention being to provide means for transmitting the power from a motor to a propeller shaft which includes reduction gears and reversing means arranged in a single box, the invention enabling a boat to be driven from an ordinary type of automobile engine and the installing of the engine in a level position.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is a sectional view showing one form of the invention.

Figure 2 is a section on line 2—2 of Figure 1.

Figure 3 is a perspective view of the clutch shifting means.

Figure 4 is a sectional view showing another form of the invention.

Figure 5 is a top plan view of Figure 4.

Figure 6 is an end view of the double gear on the motor driven shaft.

Figure 7 is a section on line 7—7 of Figure 4.

Figures 8, 9 and 10 are diagrammatic views showing how the invention can be arranged with respect to the engine.

Referring to Figures 1 to 3, the letter A indicates a box or casing and the numeral 1 indicates a portion of the propeller shaft which extends within the casing and is suitably journaled therein, as shown at 2. This shaft carries the gear 3 and the friction wheel 4, the gear and wheel having beveled peripheries. A stub shaft 5 is journaled in the box or casing and has slidably mounted thereon a double conical friction member 6, with a spring 7 normally holding the one conical part of the member out of engagement with the friction wheel 4. The shaft 8, which is driven from the engine, has a hollow portion extending into the box and a section 8' of this shaft extends into the hollow portion, as shown in Figure 1. The hub 9 of a beveled gear 10 is rotatably arranged in one side of the box and a part of the hollow portion of the shaft 8 is rotatably arranged in this hub. The gear 10 meshes with the gear 3 and has clutch teeth 11 on its inner face which are adapted to engage with clutch teeth 12 connected with one face of the friction wheel 13 which is slidably but non-rotatably mounted on the shaft 8. This wheel 13 has a beveled periphery for engaging the second part of the member 6 when the teeth 12 are moved out of mesh with the teeth 11.

A pair of cross heads 14 is fastened to a pair of rods 15 slidably supported in the gear box and passing through one wall thereof and a link 16 is connected to a cross piece 17 which connects the outer ends of the rods together, this link being suitably connected to a pedal or lever so that the rods 15 can be moved longitudinally. A pair of transverse rods 18 is carried by the cross heads 14 and these rods 18 pass through a groove 19 formed in a portion of the gear 13 so that when the cross heads and rods 15 are moved, the gear 13 will be shifted from the neutral position to a position where the teeth 12 will engage the teeth 11 or to a position where the gear 13 will engage the member 6.

From the foregoing it will be seen that when the teeth 12 are in engagement with the teeth 11, motion of the shaft 8 will be transmitted to the propeller shaft 1 through the gears 10 and 3 and that when the gear 13 is moved in engagement with the member 6 and sufficient pressure applied to the clutch shifting means to cause the member 6 to engage the friction wheel 4, then motion of the shaft 8 will be transmitted to the propeller shaft through the parts 13, 6 and 4 to rotate the shaft 1 in a reverse direction.

In the modification, the reverse motion is imparted to the propeller shaft from the drive shaft through means of gears instead of the friction members and in said modification, the gear 10' is formed with an extension having internal teeth 20 thereon which are engaged by the teeth of the sliding gear 13' carried by the shaft 8" and said gear 13', when moved to a certain position, will also mesh with the teeth of a gear 21 carried by a stub shaft 5' and said gear 21 has attached thereto a beveled gear 22 which meshes with a beveled gear 23 on the propeller shaft 1'. Thus when the gear 13' is in mesh with the teeth 20, the propeller shaft will be driven in one direction through the gears 10' and 3' and when the gear 13' has been moved out of mesh with the teeth 20 and into mesh with the gear 21, the propeller shaft will be rotated in a reverse direction through means of said gears 13' and 21 and the gears 22 and 23.

The means for shifting the gear 13' comprises a tubular member 24 fastened to a shaft 25 journaled in a part $a$ of the box or casing A', with its ends projecting from said part $a$ so that a shifting member 26 may be attached to one or both of said ends. The tubular member 24 is provided with the depending arms 27 which carry rollers 28 which are arranged in an annular groove 19' in the hub of the gear 13'. A detent 29 holds the tubular member, with its associated parts, in adjusted position. The shaft 8" may be connected to the shaft of a motor or a shaft driven from the motor through the coupling 30 and the opposite end of the shaft 8" may be provided with the clutch 31 for receiving a crank, such as shown at 32 in Figures 8 and 9, so that the engine can be started by hand. Of course, this hand cranking means can be used with the first form of the invention, or the motor in both forms of the invention may be provided with power starters. Suitable anti-friction bearings are provided for the various parts, as shown at 33.

From the foregoing it will be seen that I have provided a combined gear box with reduction gears and forward and reversing means arranged in a single unit for enabling a propeller shaft of a boat to be driven from an automobile motor and the invention permits the motor to be placed in a horizontal position with the propeller shaft arranged in a diagonal position. The invention also permits the engine to be placed in front of the gear box, as shown in Figure 8, where the letter M indicates the motor and the letter A the gear arrangement, or the motor can be placed in the stern of the boat in rear of the gear arrangement, as shown in Figure 9, or two motors can be used, one in front of the gear box and the other in rear thereof, as shown in Figure 10.

While the driven shaft is referred to as a propeller shaft, it will be understood that this shaft is really attached to the propeller shaft by a suitable coupling. The reduction gears may be of any desired ratio and the ratio may be changed by simply substituting other gears for those in use.

While Figure 9 shows the motor arranged close to the gear box, it will be understood that the motor can be placed any desired distance from the box, as any length of shaft can be used for connecting the motor shaft to the drive shaft.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. A device of the class described comprising a drive shaft, a driven shaft, reducing gears connecting the shafts together, the gear on the drive shaft being loosely arranged thereon and having exterior and interior teeth thereon, a sliding gear on the drive shaft adapted to mesh with the interior teeth of the reducing gear, a reversing gear on the driven shaft, a stub shaft, a double gear thereon having a part meshing with the reversing gear and another part adapted to mesh with the sliding gear and manully operated means for moving the sliding gear from a neutral position into engagement with either the interior teeth of the reducing gear or into engagement with a part of the double gear.

2. A device of the class described comprising a drive shaft, a driven shaft, reducing gears connecting the shafts together, the gear on the drive shaft being loosely arranged thereon and having exterior and interior teeth thereon, a sliding gear on the drive shaft adapted to mesh with the interior teeth of the reducing gear, a reversing gear on the driven shaft, a stub shaft, a double gear thereon having a part meshing with the reversing gear and another part adapted to mesh with the sliding gear, manually operated means for moving the sliding gear from a neutral position into engagement with either the interior teeth of the reducing gear or into engagement with a part of the double gear and a casing enclosing portions of the drive and driven shafts and the gears.

3. A device of the class described comprising a drive shaft, a diagonally arranged driven shaft, reducing gears connecting the shafts together, the gear on the drive shaft being loosely arranged thereon and having exterior and interior teeth thereon, a sliding gear on the drive shaft adapted to mesh with the interior teeth of the reducing gear, a reversing gear on the driven shaft, a stub shaft, a double gear thereon having a part meshing with the reversing gear and another part adapted to mesh with the sliding gear and manually operated means for moving the sliding gear from a neutral position into engagement with either the interior teeth of the reducing gear or into engagement with a part of the double gear.

In testimony whereof I affix my signature.

HERBERT PAUL PRIGG.